United States Patent [19]

Carvalho

[11] Patent Number: 5,391,055
[45] Date of Patent: Feb. 21, 1995

[54] PROPELLER PITCH CHANGE MECHANISM WITH IMPULSE TURBINES

[75] Inventor: Paul A. Carvalho, Westfield, Mass.

[73] Assignee: United Technologies Corporation, Hartford, Conn.

[21] Appl. No.: 158,051

[22] Filed: Nov. 24, 1993

[51] Int. Cl.⁶ .............................................. B64C 11/42
[52] U.S. Cl. ................. 416/157 A; 416/157 R; 416/162; 416/165
[58] Field of Search ........... 416/154, 155, 156, 157 R, 416/157 A, 157 C, 162, 165

[56] References Cited

U.S. PATENT DOCUMENTS

| 3,664,763 | 5/1972 | Chilman | 416/157 A |
| 3,802,799 | 4/1974 | McMurtry | 416/157 A |
| 3,866,415 | 2/1975 | Ciokajlo | 416/157 A |
| 4,523,891 | 6/1985 | Schwartz et al. | 416/165 |
| 4,750,862 | 6/1988 | Barnes et al. | 416/165 |
| 5,141,399 | 8/1992 | Duchesneau et al. | 416/165 |
| 5,199,850 | 4/1993 | Carvalho et al. | 416/165 |

FOREIGN PATENT DOCUMENTS 0582263 11/1946 United Kingdom ........... 416/157 A

Primary Examiner—Edward K. Look
Assistant Examiner—Christopher Verdier
Attorney, Agent, or Firm—Norman Friedland

[57] ABSTRACT

The pitch of either a fan or propeller driven by a gas turbine engine is changed by utilizing a pair of impulse turbines interfacing between the stationary and rotating portion of the fan or propeller and utilizing a servo control responding to a desired pitch input signal for actuating the normally inactive impulse turbines during fixed pitch to drive the impulse turbine which in turn is operatively connected through a pitch change actuator to change the pitch in accordance with the input signal.

10 Claims, 2 Drawing Sheets

PROPELLER PITCH CHANGE MECHANISM WITH IMPULSE TURBINES

TECHNICAL FIELD

This invention relates to a pitch change mechanism for a variable pitch propulsor and particularly to a pitch change mechanism utilizing impulse turbines for varying the pitch of the fan for an advance ducted propulsor (ADP).

BACKGROUND ART

With the advent of advanced ducted propulsors which utilize a variable pitch fan in the gas turbine engine, there has been a need for an effective, lighter and less expensive pitch change mechanism that will vary the pitch of the fan. It is well known that because the pitch change mechanism is mounted in the fan hub it must not only be light weight it also must be compact. To this end several concepts have been disclosed that attempt to serve this purpose and they include hydromechanical and electo-mechanical versions that incorporate either a ball screw and ball screw nut pitch change actuator or a hydraulic actuator.

U.S. Pat. No. 5,199,850 granted to E. H. Kusiak and myself on Apr. 6, 1993 entitled "Pitch Stop Assembly For Variable Pitch Change Propulsor" and assigned to United Technology Corporation, the assignee common with this patent application discloses a mechanical pitch actuation system that is capable of being utilized in a ducted fan for gas turbine engines, sometimes referred to as Advanced Ducted Propulsor (ADP). As is disclosed in this patent, a well known ball screw actuator is utilized to effect pitch change movement. The ball screw actuator consists of a ball screw that during fixed pitch rotates at the same angular velocity as the fan. By virtue of a differential gear train operatively connected to the ball screw, an input signal to the differential gear train changes the rotational speed relationship of the differential gear train to the ball screw to effectuate a rotation of the ball screw to either a clockwise or counter clockwise direction for pitch change movement. The ball screw nut operatively connected to the ball screw is caused to translate. This rectilinear movement is converted to rotary movement of the fan blades by the trunnion eccentrically attached to the base of the fan blade. The motion from the ball screw nut to the trunnion is transmitted by a yoke and linkages to rotate the plurality of blades in unison about their longitudinal axis. Obviously, the input signal to the differential gear train will ultimately rotate the blades to either a course or fine pitch.

U.S. Pat. Nos. 5,183,387 and 5,205,712 granted to Huggert et al on Feb. 2, 1993 entitled "Fault-Tolerant Apparatus For Controlling Blade Pitch" and granted to Hamilton on Apr. 27, 1993 and entitled "Variable Pitch Fan Gas Turbine Engine", respectively, for example, disclose electrical pitch change mechanism. These patents disclose electrical induction machines with fixed windings cooperating with rotating windings fixed to the rotating fan shaft that are in a fixed pitch position until the electrical pitch change mechanism is actuated. Pitch change is effected by exciting the fixed winding to induce a braking effect of the rotating connecting mechanism that is translated to the fan blades through suitable linkages. Typically two or three induction machines are utilized to vary the pitch to course, fine blade angles and feather.

One of the systems contemplated for the ADP propeller pitch change mechanism is a dual electrical induction motor system that is operatively connected to the ball screw of the ball screw actuator similar to the one disclosed in U.S. Pat. No. 5,199,850. In this system the ball screw is rotated by a gear train which results in translating motion of the ball screw nut. This translating motion is converted into rotary motion at the blades through trunnions attached to the base of each blade.

To change pitch, two electrical induction machines are utilized; one for increase pitch and the other for decrease pitch. Each induction machine includes a stator winding and a rotor winding. The rotor winding is mounted around the engine output shaft and by energizing the stator winding the magnetic field in the gap between the winding varies to impart a breaking effect on the rotor winding. The rotor of each induction machine drives a ring gear that is operatively connected to the feed drive that drives the ball screw. One of the rotors is directly connected thereto while the other imposes a gear train between the rotor output shaft and the ball screw so as to impart rotation in a direction that is opposite to the direction of the other induction machine. Hence, one of the induction machines serves to position the blades for fine pitch change and the other serves to position the blades for course pitch change. The rotors of both induction machines are mounted on one output shaft connected to the ball screw gear train with a feed through gear. By energizing one of the windings of either induction machines, the angular velocity of that rotor excited by that winding becomes retarded relative to the engine shaft to drive the rotary ball shaft and in turn translate the ball screw nut. The trunnion eccentrically mounted to the base of the blade coupled to the translating ball screw nut converts the axial motion to rotary motion for varying the pitch of the blade.

As one skilled in this art will appreciate, the system described immediately above requires high powered electronics and a power supply to drive the inductive machines.

This invention contemplates a different mode of pitch change actuation by employing a pair of hydraulically powered impulse turbines thus eliminating the high powered electronics and power supply resulting in a reduction in weight and cost of heretofore known pitch change actuation systems.

SUMMARY OF THE INVENTION

An object of this invention is to provide for a variable pitch fan of a gas turbine engine an improved pitch change mechanism characterized as being compact, lighter and less expensive than heretofore known systems.

An object of this invention is to provide for a ducted variable pitch fan for a gas turbine engine impulse turbines to control the pitch change mechanism.

A feature of this invention is that the impulse turbines transmit rotary motion as a function of a pitch change input signal across a stationary interface to a rotary shaft for actuating the pitch change actuation system. The rotary shaft is operatively connected to a ball screw which in turn, translates a ball screw nut. The ball screw nut and its appendage interconnects the trunnion eccentrically attached to the base of the fan blade to convert the rectilinear motion to pitch change motion for obtaining course and fine pitch positions. One of the impulse turbines serves to rotate the fan blades to fine pitch and the other serves to rotate the blades to course pitch.

The foregoing and other features of the present invention will become more apparent from the following description and accompanying drawings.

DETAILED DESCRIPTION OF THE PREFERRED EMBODIMENT

Figure 1:
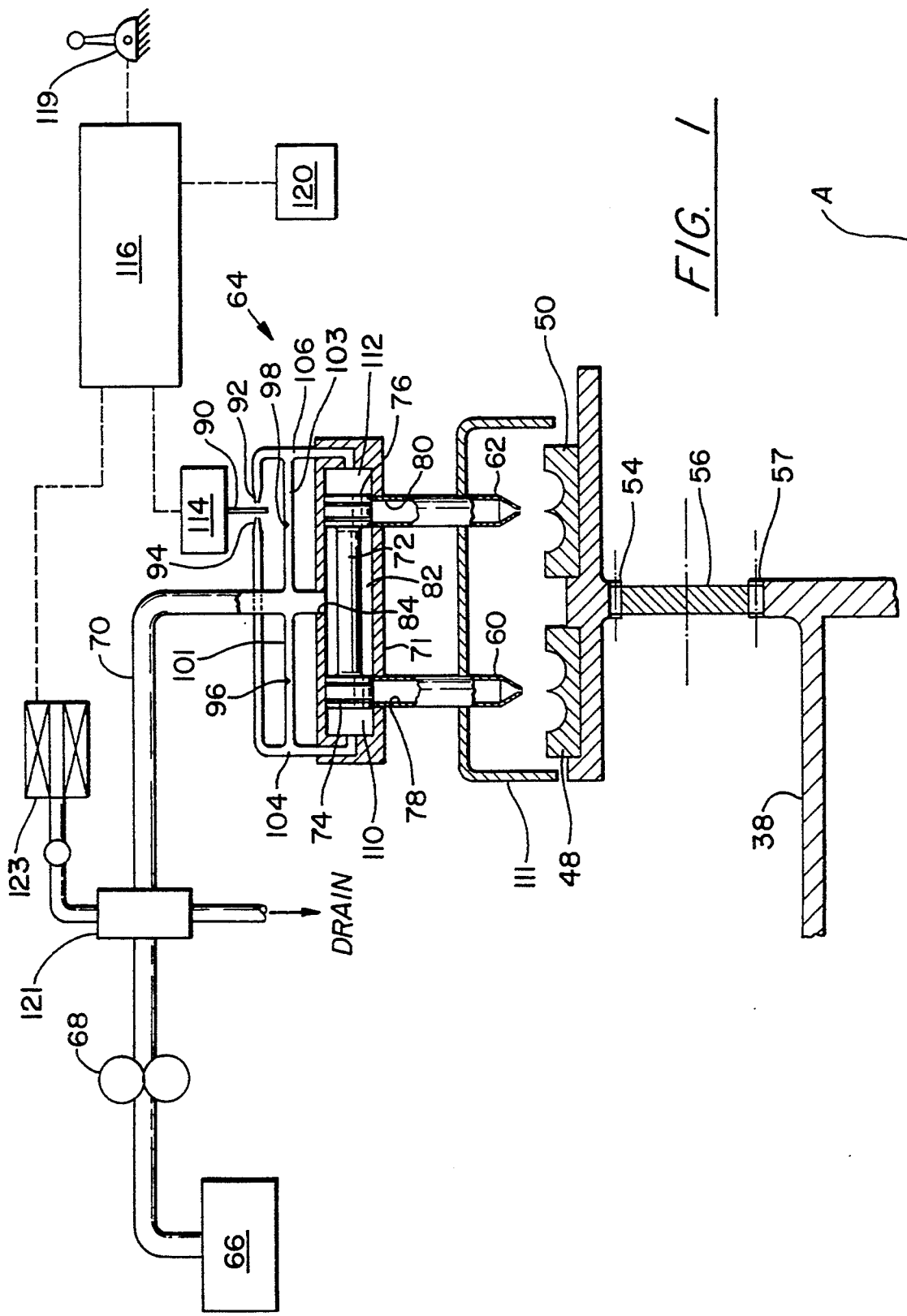
FIG. 1 is a schematic of the fan blade in a ADP application utilizing the impulse turbine of this invention.
Figure 2:
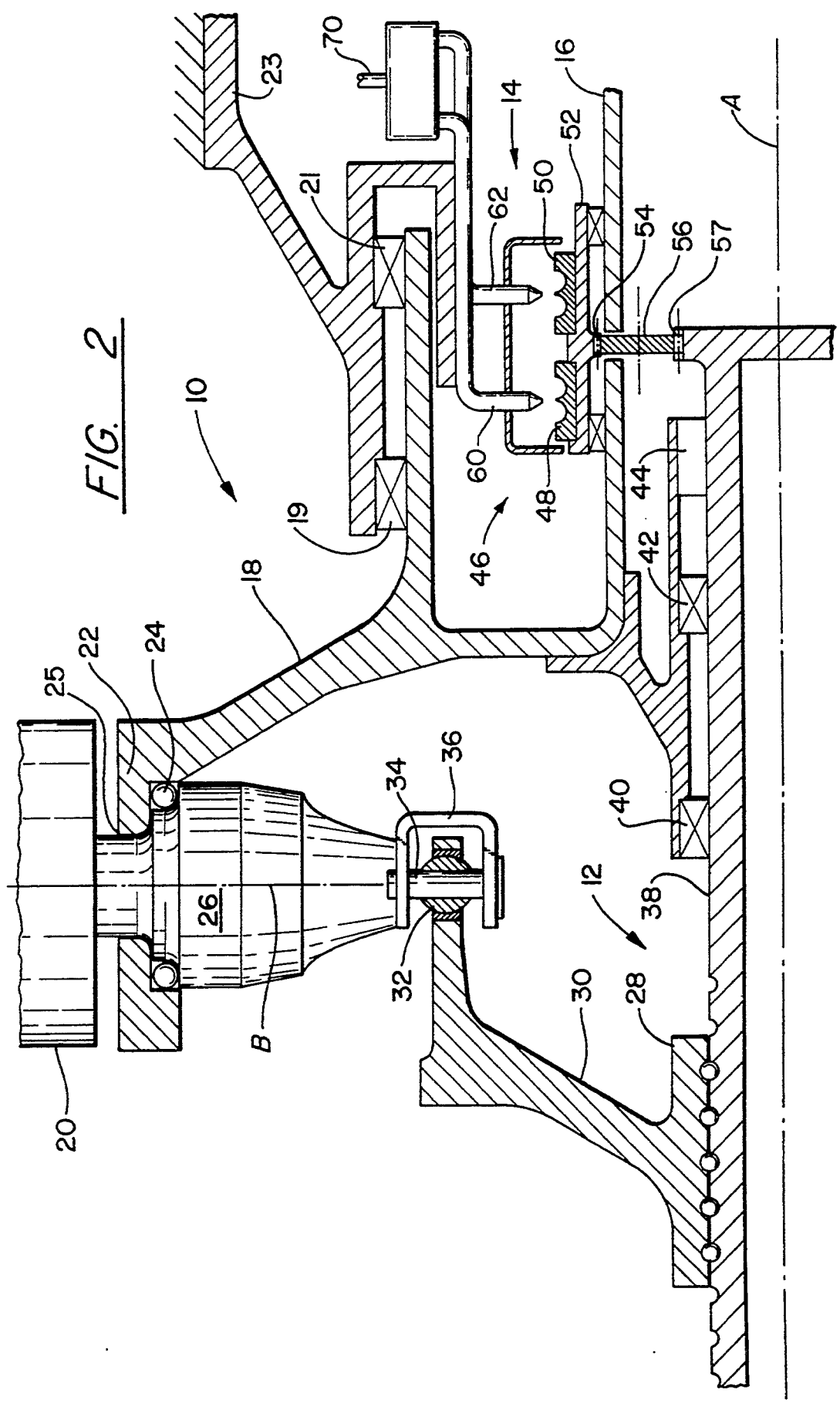
FIG. 2 is a schematic illustration of the impulse turbine coupled to a servo control system for effectuating pitch change movement.

Referring to FIGS. 1 and 2 which schematically illustrate this invention as comprising the variable pitch fan generally indicated by reference numeral 10, the pitch change actuator generally indicated by reference numeral 12 and the pitch change actuator control generally illustrated by reference numeral 14. The variable pitch fan, as part of the ADP, is driven by the output shaft 16 which, in turn, is driven by the gas turbine engine core (not shown). Output shaft 16 is driven by a speed reduction gear box that serves to reduce the rotational speed of the turbine engine main shaft. Inasmuch as the rotational speed of the gas turbine engine's shaft is typically higher than what is required for efficient fan operation, it is typical to include a gear box (not shown) that serves to reduce the speed to a value for fan efficient operation. Gas turbine engines and gear boxes are well known and the core of engines manufactured by Pratt & Whitney, a division of United Technologies Corporation such as the JT-8D, JT-9D, PW 2000 or the PW 4000 families of engines are representative of the types of engines that can be employed with this invention. Suffice it to say that it is typical for an engine manufacturing company to utilize the gas generator portion of existing or production engines (the core) and design the other portion of the engine to accommodate the variable pitch fan.

As this invention is merely concerned with the pitch change mechanism, for the sake of convenience and simplicity only that portion of the engine that is necessary for an understanding of this invention will be disclosed in this patent application. Suffice it to say that the fan blades are typically changed for take-off and cruise conditions so as to optimize the performance in both of these modes of operations. The fan may also include pitch lock, reversing, ground operation and feathering systems which are conventional utilized in variable pitch propellers. These types of systems are well known in this art and although are not a part of this invention, such systems may be integrated into the design of the present invention.

While the systems described herein are shown in schematic fashion, it is to be understood that the implementation of these systems are within the skill of those deemed skilled in the art and the preferred embodiment is disclosed in this manner for the sake of convenience and clarity for an understanding of the nature of this invention.

The gear box drive shaft 16 drives the disk or hub 18 mounted for rotational movement about axis A and supported to bearings 19 and 21 journaled in fixed housing 23, which, in turn, rotates the variable pitch fan blades 20 about the shaft's axis A. Typically, the blades mounted in the barrel 25 of disk 18 and supported for pitch change movement about the longitudinal axis B by the spherical bearings 24. It is contemplated that the number of blades for ADP application is between 12 and 24. Each blade carries at its root or base an eccentrically mounted trunnion 26 that serves to convert the rectilinear motion of the ball screw nut 28 into rotary motion for pitch change. Systems of this type are aptly described in U.S. Pat. No. 5,199,850 and for further details reference should be made thereto which is incorporated herein by reference.

The ball screw nut 28 is operatively connected to trunnion 26 via the yoke 30 and the rod end 32 and pin 34 which is supported in coplanar relationship with axis B. There being a rod end 32 and pin 34 assembly and the clevis 36 supporting the pin 34 for each of the blades 20 (one of each element being shown) for attaining uniform rotation of all of the blades. Rotation is effectuate by rotation of the ball screw 38 supported for rotary motion about the axis A by bearings 40 and 42 which, in turn, translates the ball screw fore and aft as will be described in further detail herein below. A spring noback system 44 for assuring that rotation of the ball screw is only in the direction imparted thereto by the input of the pitch change actuator control system. That is to say that the noback prevents reverse rotation that may be inadvertently caused by the blades attempting to drive the ball screw. This pitch change actuation system is described in more detail in my copending U.S. patent application Ser. No. 08/147,236 filed on Oct. 28, 1993 and entitled "Propeller Pitch Change Mechanism" and mailed to the Patent and Trademark Office on Oct. 28, 1993 incorporated herein by reference.

The next portion of this description will be devoted to the pitch change actuated control system. In accordance with this invention, the pitch change actuation control system is comprised of an impulse turbine system generally indicated by reference numeral 46. Impulse turbines are well known and are described in engineering text books, as for example, "Fluid Mechanics" by Victor L. Streeter, 6th edition, published by Mcgraw Hill, 1975. The pitch change actuation control system of this invention utilizes a pair of impulse turbines 48 and 50 mounted on turbine rotor 52 for rotation therewith which is, in turn, rotatably supported to the output shaft 16. Fixed to turbine rotor shaft 52 is ring gear 54 which meshes with feed-through gear 56 for imparting rotary motion to ball screw shaft 38.

As will become apparent from the description to follow the direction of rotation of the feed-through gear 56 and hence, the ball screw 38 is predicated on which of the impulse turbines, 48 or 50 are actuated. Impulse turbines 48 and 50 are rotated by flowing high pressure fluid to impinge on the blades of the impulse turbines in a well known manner through either nozzles 60 or 62. The servo system generally indicated by reference numeral 64 serves to control the flow of fluid from a high pressure source to either of the two nozzles 60 or 62.

As best shown schematically in FIG. 1, the high pressure fluid from reservoir 66 is pressurized by suitable hydraulic pump 68 and fluidly connected to the nozzles 60 and 62 via conduit 70 and spool valve 71. When in the fixed pitch position the spool 72 of spool valve 71 is in the null position shown in FIG. 1, where lands 74 and 76 cover outlet ports 78 and 80 fluidly connected to nozzles 60 and 62, respectively. Fluid is continuously admitted to the annular passage 82 via the inlet port 84. When spool 72 is positioned to the left, outlet port 78 is fluidly connected to annular passage 82 to actuate nozzle 60. And, vice versa, when spool 72 is moved in the right direction outlet port 80 is fluidly connected to annular passage 82 and nozzle 62 becomes actuated. Actuation of nozzles 60 and 62 are controlled by the servo system that is comprised of the flapper valve 90, jet nozzles 92 and 94, flow restrictors 96 and 98 and the operatively connected fluid flow lines 101 and 103 and trunk lines 104 and 106 in fluid flow relationship with conduit 70.

In the balanced or null condition, that is when flapper valve is midway between the jet nozzles 92 and 94, the pressure drop across restrictors 96 and 98 will be equal and hence, the pressure in the cavities 110 and 112 formed in either end of spool valve 71 will be equal and since the diameter of the fluid acting faces of lands 74 and 76 are equal the forces on the spool 72 will be balanced to position the valve as shown in FIG. 1. Obviously, as the flapper valve 90, actuated by actuator or torque motor 114 which is controlled by the full authority digital electronic control 116 (FADEC) in response to the input signal from the power lever 119 operated by the aircraft personnel, is pivoted to move either to the left or right toward either one jet nozzle and away from the other jet nozzle, the pressure drops across restrictors 96 and 98 will become unequal and the unequal pressure balance across spool 72 will cause it to move to uncover either outlet port 78 or 80 to actuate either nozzle 60 or 62. The system requires a suitable pressure regulating valve shown in blank box 121 for maintaining the pressure in conduit 70 at a constant value. Pressure regulating valves are well known and are commonly utilized in fuel controls as for example the JFC-12 and JFC-60. Preferably, pressure regulating valve 121 will be of the two level variety, namely, it will provide high pressure during transient pitch change conditions and low pressure during static pitch change conditions. A suitable dual solenoid system represented by the blank box 123 serves to control the pressure regulating valve 121 to place it in its proper operating level for the appropriate pitch change condition.

A suitable FADEC as well as pressure regulating valves are manufactured by Hamilton Standard a division of United Technologies Corporation, the assignee common to this patent application and are commercially available.

An oil catcher 111 and a suitable scavenger system (not shown) may be necessary in order to return the spent fluid discharging from the impulse turbines either back to the reservoir or to the inlet of pump 68.

OPERATION

To effectuate pitch change movement, say to course pitch, the FADEC in response to a new power lever setting, will input a signal to actuator 114 which, in turn, will position flapper 90 to the right toward jet nozzle 92, restricting the flow egressing from jet nozzle 92 and increasing the flow egressing from jet nozzle 94. This will lower the pressure drop across restriction 98 with a consequential increase of the pressure drop across restrictor 96. This unbalance will cause a force unbalance across spool 72 of valve 71 forcing the spool 72 of valve 71 to travel toward the left hand side as viewed in FIG. 1 uncovering outlet port 78 and connecting nozzle 60 directly with the output of pump 68, which pressurizes the fluid to say 1000 psi. The pump to achieve this pressure is rated to say, 25 horsepower (maximum).

By actuating nozzle 60 the jet stream of fluid egressing therefrom will impinge on the impulse turbine 48 to cause it to rotate. This powers impulse turbine 48 which, in turn, drives turbine rotor shaft 52 with a consequential rotation of the meshing gear train consisting of ring gear 54, feed-through gear 56 and spur gear 57 operatively connected to ball screw 38. This action will ultimately rotate ball screw in the clockwise direction.

The rotary motion of ball screw 38 will cause ball screw nut to translate toward the right as viewed in FIG. 2 and, in turn, causes the blades to rotate about the longitudinal axis B toward course pitch, via the yoke 30, rod end 32, pin 34 and trunnion 26 as was described hereinabove.

Obviously, an opposite input signal to the servo system will operate the pitch change mechanism to obtain fine pitch. The FADEC 116 will input a signal calling for fine pitch to actuator 114 which, in turn, positions flapper valve 90 toward jet nozzle 94 and away from jet nozzle 92. This will cause an unbalance across restrictors 96 and 98 to force the spool 72 of spool valve 71 to move toward the right as viewed in FIG. 1. This will operatively connect the output of pump 68 to nozzle 62 and rotate the impulse turbine 50 in a direction that is opposite from the rotation of impulse turbine 48. The impulse turbine 50 will cause the ball screw actuator to rotate in a counter clockwise direction to rotate the blades about the longitudinal axis B toward fine pitch, via the ball screw nut 28, yoke 30, rod end 32, pin 34 and trunnion 26.

A conventional feedback system shown in the block 120 responsive to the position of blades 20 nulls out the output signal from the FADEC 116 to return the spool valve 71 to its null position and deactivate the nozzles 60 and 62.

It should be understood that the servo system and pitch change actuator control just described may utilize either nozzles to control pitch to the fine and course blade angles and the selection of either nozzle is completely arbitrary and by no means is a limitation on the scope of this invention.

Not only does this invention provide a lower weight and less expensive pitch change system, it also eliminates the need for high power electronics and a power source generator utilized in heretofore known systems designed to accomplish the same functions. Also of importance is the fact that the nozzles can be mounted on existing gear box structure and thus, eliminating the need of including additional support structure and its attendant increased weight.

Although this invention has been shown and described with respect to detailed embodiments thereof, it will be appreciated and understood by those skilled in the art that various changes in form and detail thereof may be made without departing from the spirit and scope of the claimed invention.

I claim:

1. For a variable pitch fan or variable pitch propeller of a gas turbine engine, said fan or propeller having a plurality of blades, means for varying the pitch of said blades, said means including a pitch change actuator operatively connected to each of said plurality of blades, means including a pair of impulse turbines for controlling said pitch change actuator, one of said impulse turbines for controlling said pitch change actuator to move said blades to a course blade angle and the other of said impulse turbines for controlling said pitch change actuator to move said blades to a fine blade angle, said pitch change actuator including a ball screw operatively connected to said pair of impulse turbines, a ball screw nut in meshing relationship with said ball screw for rectilinear motion, each of a plurality of trunnions attached to the base of each of said blades, a yoke operatively connected to said ball screw nut and connection means operatively interconnecting said yoke and said trunnions to impart pitch change movement during transient conditions of said pitch change actuator and gearing means defining a gear train in meshing relationship including an internal gear operatively connected to said pair of impulse turbines, a spur gear mounted on one end of said ball screw and a feed-through gear interconnecting said internal gear and said spur gear for imparting rotary motion to said ball screw in a selective clockwise direction and counterclockwise direction.

2. For a variable pitch rotating fan or variable pitch propeller as claimed in claim 1 including a servo system, a source of fluid, pump means for increasing the pressure of the fluid in said source of fluid, fluid connection means interconnecting said source of fluid, said pump and said servo system, a pair of powering nozzles for driving said impulse turbines by impinging fluid on said impulse turbines for effectuating rotation thereof, said servo system including means for selectively interconnecting said pump to said pair of nozzles, and control means responsive to a desired fine pitch condition or course pitch condition for controlling said servo system.

3. For a variable pitch fan or variable pitch propeller as claimed in claim 2 including a pressure regulating valve disposed between said pump and said servo system for regulating the pressure in said fluid connection means.

4. For a variable pitch rotating fan or variable pitch propeller as claimed in claim 1 including spring no-back means operatively connected to said ball screw to prevent said ball screw from rotating in an opposite direction from the direction imparted thereto by either of said pair of impulse turbines.

5. For a variable pitch fan or variable pitch propeller as claimed in claim 3 wherein said servo system includes a flapper valve, a pair of jet nozzles fluidly connected to said pump being controlled by said flapper valve, a spool valve having a pair of outlet ports fluidly connected to said pair of powering nozzles, fluid flow means including flow restriction means fluidly interconnecting said jet nozzles and said spool valve and means responsive to a desired pitch of said fan blades for controlling said flapper valve for selectively interconnecting said pair of outlet ports with said pair of powering nozzles whereby each of said impulse turbines are selectively fluidly connected to the outlet of said pump.

6. For a variable pitch fan or variable pitch propeller as claimed in claim 3 wherein said pressure regulating valve includes means for regulating the pressure at two different pressure levels.

7. For a variable pitch fan or variable pitch propeller as claimed in claim 6 including a solenoid switch for selectively activating said pressure regulator.

8. For a variable pitch rotating fan or variable pitch propeller of a gas turbine engine, a non-rotating casing supporting said rotating fan or propeller, said rotating fan or propeller having a plurality of blades, means for varying the pitch of said blades, said means including a pitch change actuator operatively connected to each of said plurality of blades for positioning said blades toward a fine blade angle and a course blade angle, impulse turbine means including impulse turbine blades disposed in the rotating portion of said rotating fan or variable pitch propeller for controlling said pitch change actuator, a source of liquid fluid, said impulse turbine means including nozzle means disposed in said non-rotating casing for directing liquid fluid to impinge on said impulse turbine blades to cause rotation thereof, conduit means interconnecting said source of liquid fluid and said nozzle means, and control means for regulating the flow of fluid in said conduit means.

9. For a variable pitch rotating fan or variable pitch propeller as claimed in claim 8 wherein said impulse turbine means includes a pair of impulse turbines, one of said impulse turbines for controlling said pitch change actuator to move said blades to said course blade angle and the other of said impulse turbines for controlling said pitch change actuator to move said blades to said fine blade angle.

10. For a variable pitch rotating fan or variable pitch propeller as claimed in claim 9 wherein said pitch change actuator includes a ball screw operatively connected to said pair of impulse turbines, a ball screw nut in meshing relationship with said ball screw for rectilinear motion, each of a plurality of trunnions attached to each of said blades, a yoke operatively connected to said ball screw nut and connection means operatively interconnecting said yoke and said trunnions to impart pitch change movement during transient conditions of said pitch change actuator.

* * * * *